United States Patent
Hara et al.

(10) Patent No.: US 8,305,849 B2
(45) Date of Patent: *Nov. 6, 2012

(54) THERMALLY-ASSISTED MAGNETIC HEAD

(75) Inventors: Shinji Hara, Tokyo (JP); Tsutomu Chou, Tokyo (JP); Koji Shimazawa, Tokyo (JP); Daisuke Miyauchi, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 13/013,025

(22) Filed: Jan. 25, 2011

(65) Prior Publication Data
US 2012/0188859 A1 Jul. 26, 2012

(51) Int. Cl.
*G11B 11/00* (2006.01)
(52) U.S. Cl. .................... 369/13.33; 369/112.27
(58) Field of Classification Search ............... 369/13.33, 369/13.32, 13.24, 13.14, 13.03, 13.02, 112.27, 369/112.09; 360/59, 125.31, 125.74
See application file for complete search history.

(56) References Cited

U.S. PATENT DOCUMENTS

| | | | |
|---|---|---|---|
| 7,330,404 B2 | 2/2008 | Peng et al. | |
| 7,529,158 B2 | 5/2009 | Matsumoto et al. | |
| 8,000,178 B2 * | 8/2011 | Shimazawa et al. | 369/13.33 |
| 8,077,556 B2 * | 12/2011 | Komura et al. | 369/13.02 |
| 8,169,861 B1 * | 5/2012 | Komura et al. | 369/13.33 |
| 2008/0205202 A1 | 8/2008 | Komura et al. | |
| 2010/0103553 A1 | 4/2010 | Shimazawa et al. | |

FOREIGN PATENT DOCUMENTS
JP 2002-304708 A 10/2002

OTHER PUBLICATIONS

P.B. Johnson, et al., "Optical Constants of the Noble Metals," *Physical Review*, vol. 6, No. 12, pp. 4370-4379 (Dec. 15, 1972) (Discussed on p. 7 of the Specification).

* cited by examiner

*Primary Examiner* — Ali Neyzari
(74) *Attorney, Agent, or Firm* — Posz Law Group, PLC

(57) ABSTRACT

A thermally-assisted magnetic head that includes an air bearing surface facing a recording medium and that performs magnetic recording while heating the recording medium includes: a magnetic recording element including a pole of which one edge part is positioned on the air bearing surface and that generates magnetic flux traveling toward the magnetic recording medium; a waveguide configured with a core through which light propagates and a cladding, at least one part of which extends to the air bearing surface, surrounding the periphery of the core; a plasmon generator that faces a part of the core and that extends to the air bearing surface. The plasmon generator is configured with a first part and a second part that are joined; the first part that is positioned on the air bearing surface side and that is made of a high melting point material, and the second part that is positioned away from the air bearing surface and that is made of a material with a small value ∈", which is an imaginary component of permittivity.

9 Claims, 12 Drawing Sheets

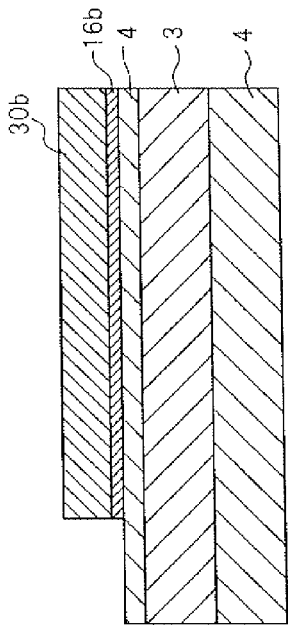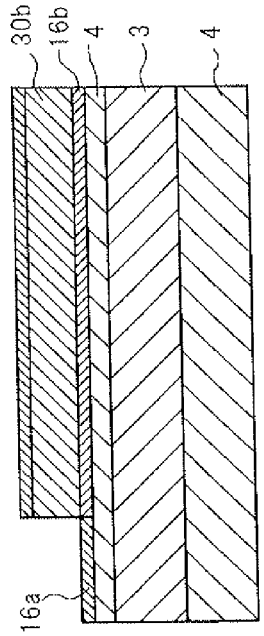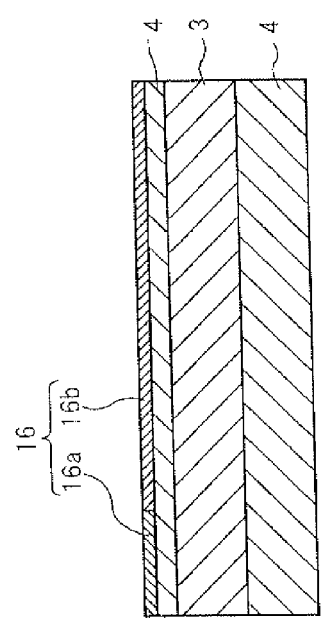
Fig.5D  Fig.5E  Fig.5F
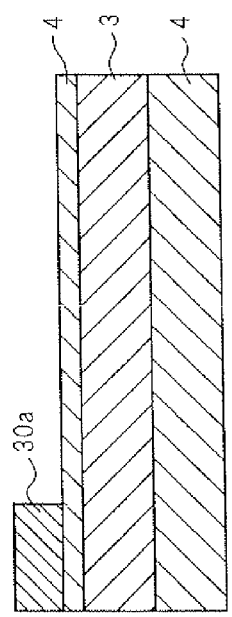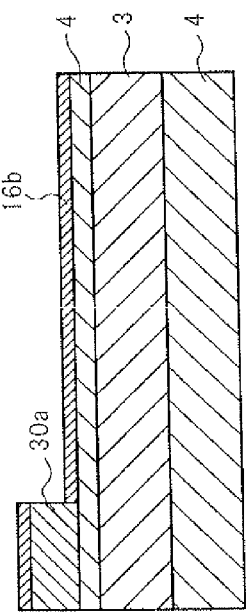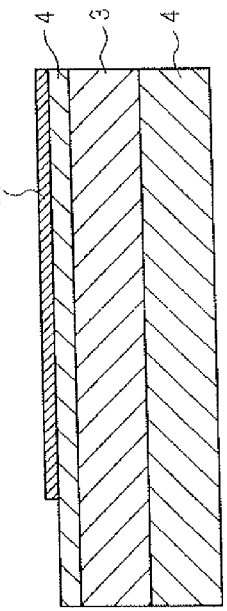
Fig.5A  Fig.5B  Fig.5C

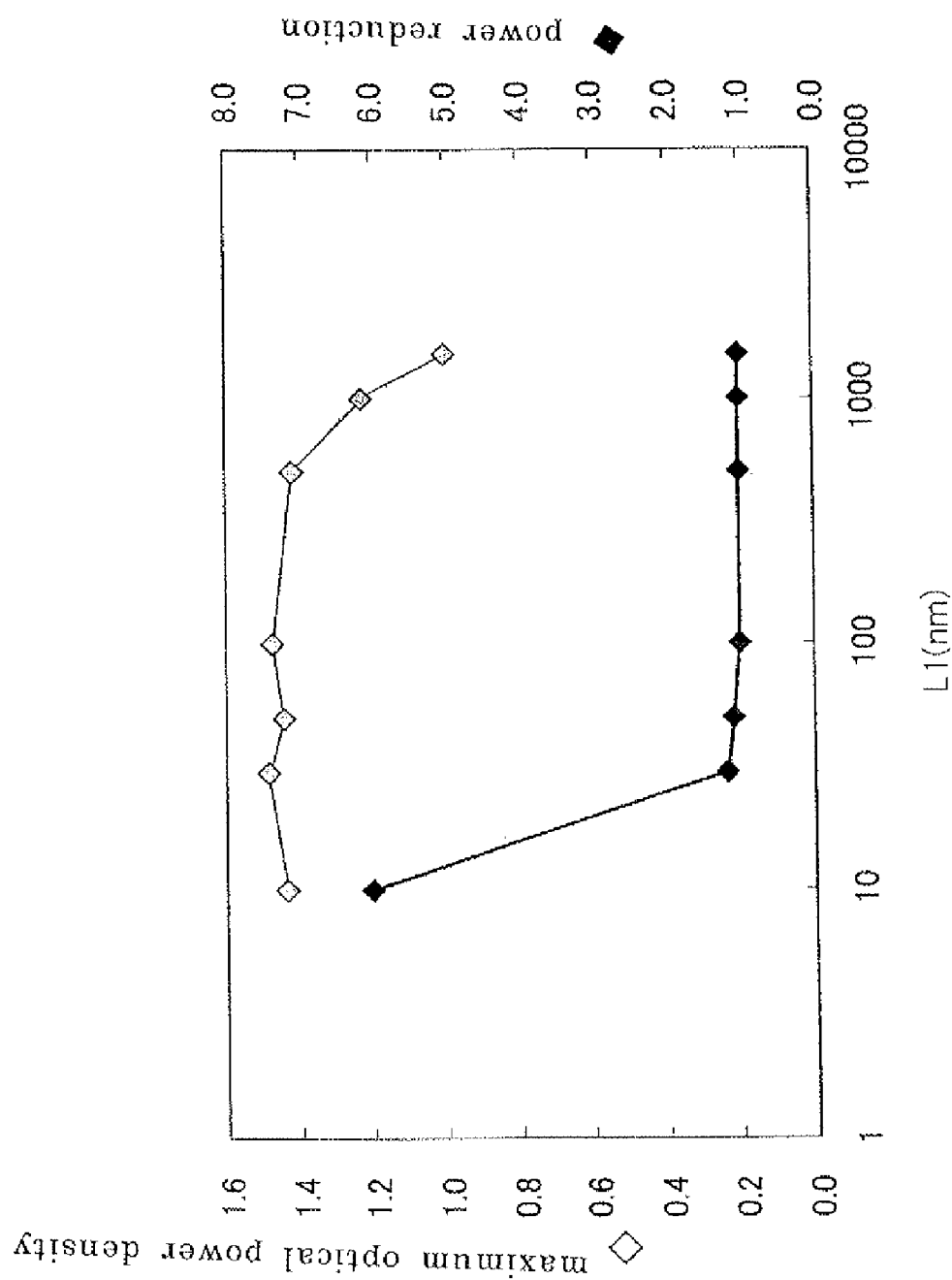

THERMALLY-ASSISTED MAGNETIC HEAD

BACKGROUND OF THE INVENTION

1. Field of the Invention

The present invention relates to a thermally-assisted magnetic head that records information while heating a magnetic recording medium to reduce coercive force of the magnetic recording medium.

2. Description of the Related Art

In recent years, regarding magnetic recording devices such as a magnetic disk device, etc., improvements have been demanded in the performance of a magnetic head and a magnetic recording medium in conjunction with high recording density. As the magnetic head, a composite-type magnetic head is widely utilized in which a reproducing head including a magneto resistive effect element (MR element) for reading and a magnetic recording head including an inductive-type electromagnetic transducer (a magnetic recording element) for writing are laminated on a substrate. In the magnetic disk device, the magnetic head flies slightly above a surface of a magnetic recording medium.

The magnetic recording medium is a discontinuous medium on which magnetic microparticles gather. Each of the magnetic microparticles has a single magnetic domain structure. One recording bit in the magnetic recording medium is configured with a plurality of the magnetic microparticles. In order to enhance the recording density, asperities on a boundary between adjacent recording bits must be reduced in size. For this, the magnetic microparticles should be reduced in size. However, reducing the magnetic microparticles in size leads to a decrease in the volume of the magnetic microparticles, resulting in a decrease in thermal stability of magnetization in the magnetic microparticles. In order to solve this problem, increasing the anisotropy energy of the magnetic microparticles is effective. However, when the anisotropy energy of the magnetic microparticles is increased, the coercive force of the magnetic recording medium is also increased. As a result, it becomes difficult to record information utilizing a conventional magnetic recording head. Conventional magnetic recording heads have such a drawback, and this is a large obstacle to achieve an increase in the recording density.

As a method to solve this problem, a so-called thermally-assisted magnetic recording method has been proposed. In this method, a magnetic recording medium with large coercive force is utilized, and heat as well as the magnetic field is applied to a portion, to which information is recorded, of the magnetic recording medium when recording the information. Therefore, the information is recorded under a state where the temperature is increased and the coercive force is decreased in the information recording portion.

For thermally-assisted magnetic recording, a method in which a laser light source is utilized to heat the magnetic recording medium is common. Two types of this method include: a method of heating the magnetic recording medium by guiding laser light to a recording portion via a waveguide, etc. (a direct heating); and a method of heating the magnetic recording medium by converting laser light to near-field light (a near-field light heating). Near-field light is, so to say, a type of electromagnetic field that is formed around substances. Ordinary light cannot be tapered to a smaller region than its wavelength due to diffraction limitations. However, when light having an identical wavelength is irradiated onto a microstructure, near-field light depending on the scale of the microstructure is generated, enabling the light to be tapered to a minimal region being approximately tens of nm in size. Since the thermally-assisted recording targets a recording density region that requires selective heating only to the minimal region being approximately tens of nm, the near-field light heating is preferred.

U.S. Patent Application Publication No. 2008/0205202 discloses a configuration in which a near-field-generator is disposed in a front part of a core of a waveguide through which light from a laser diode (LD) propagates.

As a specific method of generating the near-field light, a method utilizing a so-called plasmon antenna, which is a metal referred to as a near-field light probe that generates near-field light from light-excited plasmon, is common.

In the plasmon antenna, the near-field light is generated by directly irradiating light; however, conversion efficiency of converting irradiated light into the near-field light is low with this method. Most of the energy of the light irradiated on the plasmon antenna reflects off the surface of the plasmon antenna or is converted into thermal energy. The size of the plasmon antenna is set to the wavelength of the light or less, so that the volume of the plasmon antenna is small. Accordingly, the temperature increase in the plasmon antenna resulting from the light energy being converted into the thermal energy is significantly large.

The temperature increase causes volume expansion of the plasmon antenna, and the plasmon antenna protrudes from an air bearing surface (ABS) that is a surface facing the magnetic recording medium. Then, the distance between an edge part of the MR element on the ABS and the magnetic recording medium increases, causing a problem that servo signals recorded on the magnetic recording medium cannot be read during the recording process. Moreover, when the heat generation is large, the plasmon antenna may melt.

Currently, a technology is proposed in which light is not directly irradiated onto the plasmon antenna. For example, U.S. Pat. No. 7,330,404 discloses a technology in which light propagating through a waveguide such as an optical fiber, etc. is not directly irradiated onto the plasmon antenna; however, the light is coupled with a plasmon generator in a surface plasmon mode via a buffer portion to excite a surface plasmon in the plasmon generator. The plasmon generator includes a near-field-generator that is positioned on the ABS and that generates the near-field light. At the interface between the waveguide and the buffer portion, the light propagating through the waveguide completely reflects off, and light, which is referred to as evanescent light, is simultaneously generated that penetrates into the buffer portion. The evanescent light and a collective oscillation of charges in the plasmon generator are coupled, and the surface plasmon is then excited in the plasmon generator. The excited surface plasmon propagates to the near-field-generator along the plasmon generator, and then generates near-field light in the near-field-generator. According to this technology, since the light propagating through the waveguide is not directly irradiated to the plasmon generator, excessive temperature increase in the plasmon generator is suppressed.

U.S. Patent Application Publication No. 2010/0103553 discloses a configuration in which a propagation edge is disposed in a plasmon generator that couples to light in a surface plasmon mode. The propagation edge that is an extremely narrow region is for propagating a surface plasmon generated in a plasmon generator to a near-field-generator positioned on an ABS.

In thermally-assisted magnetic recording that records while heating predefined portions of the magnetic recording medium, a temperature increase in the thermally-assisted magnetic head itself as well as the magnetic recording medium cannot be prevented. A loss generated when a surface plasmon propagates through a propagation edge of the plasmon generator is a major factor in the temperature increase of the thermally-assisted magnetic head. Specifically, when the plasmon generator is formed in protuberant shape toward a core on the ABS as disclosed in U.S. Patent Publication 2010/0103553, migration due to temperature increase is more likely to occur at a tip part in the protuberant shape toward the core. The migration in the plasmon generator may lead to lower output of the thermally-assisted magnetic head.

Note, JP Laid-Open Publication 2002-304708 discloses a configuration of a magnetic head without thermal assistance in which an ABS-side surface of a pole of a magnetic recording element is covered with a high corrosion-resistant magnetic film. Since the magnetic head is not made for thermally-assisted magnetic recording, the magnetic head does not include a plasmon generator, and also migration due to the temperature increase in the plasmon generator is not noticed.

The invention disclosed in U.S. Pat. No. 7,529,158 has a configuration in which a plasmon generator is configured as a composite material made from two materials. Specifically, FIG. 24A discloses a configuration in which the vicinity of a vertex of the plasmon generator on an ABS side is formed of Pt, Pd, Rh, Ir, Ti, Cr, Co, Si or SiN having high hardness. The configuration allows the mechanical durability to improve with the materials with high hardness; however, the configuration is not for preventing migration resulting from the temperature increase.

SUMMARY OF THE INVENTION

It is an object of the present invention to provide a thermally-assisted magnetic head that may suppress migration due to temperature increase of a plasmon generator.

A thermally-assisted magnetic head of the present invention that includes an air bearing surface facing a recording medium and that performs magnetic recording while heating the recording medium includes: a magnetic recording element including a pole of which one edge part is positioned on the air bearing surface and that generates magnetic flux traveling toward the magnetic recording medium; a waveguide configured with a core through which light propagates and a cladding, at least one part of which extends to the air bearing surface, surrounding the periphery of the core; a plasmon generator that faces a part of the core and that extends to the air bearing surface. The plasmon generator is configured with a first part and a second part that are joined; the first part that is positioned on the air bearing surface side and that is made of a high melting point material, and the second part that is positioned away from the air bearing surface and that is made of a material with a small value $\in$", which is an imaginary component of permittivity.

With this configuration, migration in a plasmon generator of a thermally-assisted magnetic head is suppressed, and further power reduction may be suppressed.

The above and other objects, features and advantages of the present invention will become apparent from the following description with reference to the accompanying drawings which illustrate examples of the present invention.

BRIEF DESCRIPTION OF THE DRAWINGS

FIGS. 5A-5F are cross sectional views for sequentially explaining manufacturing processes of the plasmon generator of the thermally-assisted magnetic head illustrated in FIGS. 1A-1B;

FIG. 7 is a graph of relationships between the length of a first part of the plasmon generator in a height direction illustrated in FIG. 4 and the maximum optical power density, and the length of the first part of the plasmon generator in the height direction illustrated in FIG. 4 and the power reduction;

DESCRIPTION OF THE PREFERRED EMBODIMENTS

Figure 1:
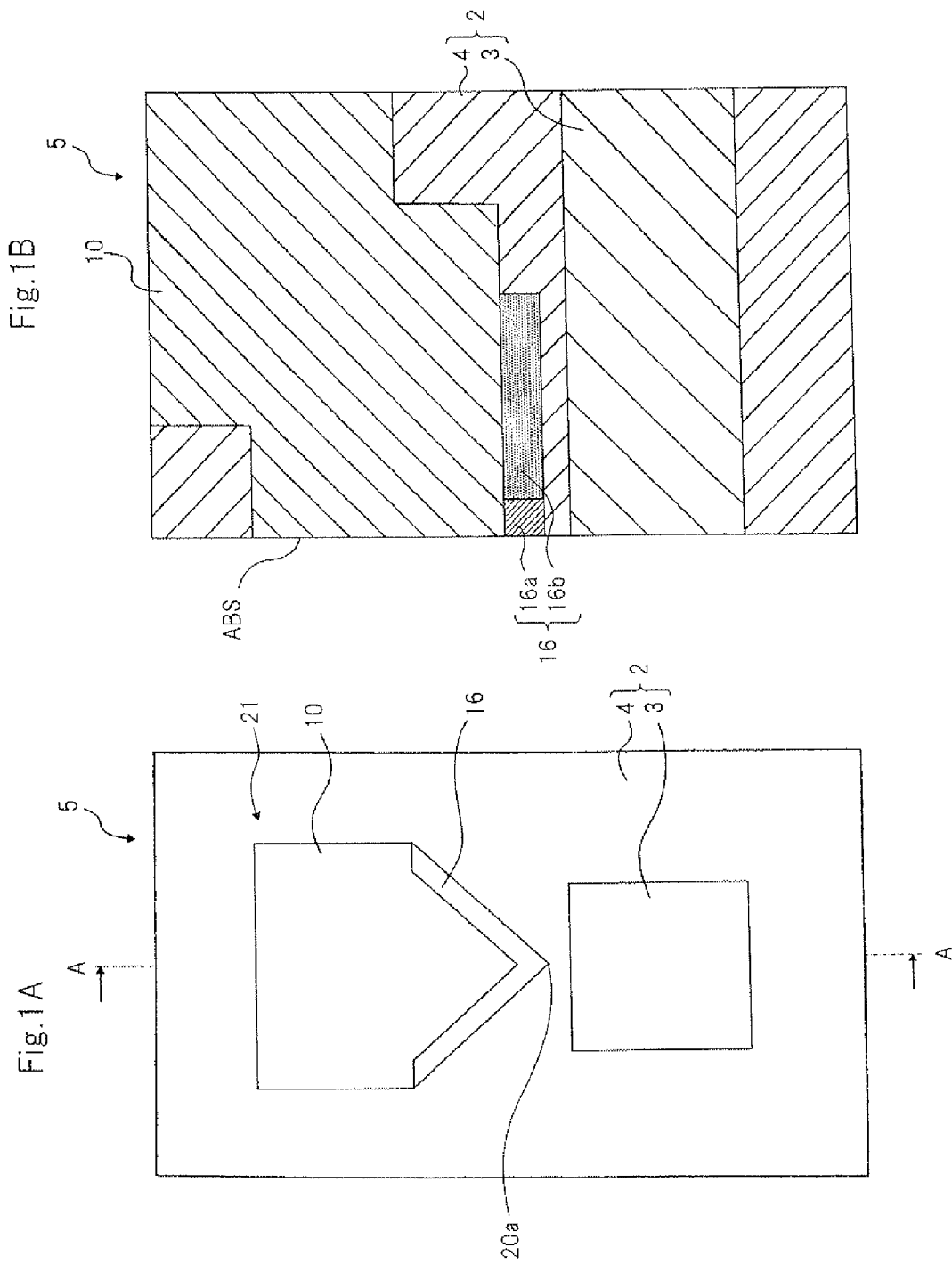
FIG. 1A is a schematic view of an ABS of a thermally-assisted magnetic head of the invention.
FIG. 1B is a schematic cross-sectional view of the thermally-assisted magnetic head illustrated in FIG. 1A, cut along line A-A of FIG. 1A.

Description regarding a thermally-assisted magnetic head of the present invention will be given referring to the drawings.

First, a basic configuration of the thermally-assisted magnetic head of the present invention will be explained. The thermally-assisted magnetic head performs so-called thermally-assisted magnetic recording in which information is recorded by applying a magnetic field when coercive force is partially reduced by heating a magnetic recording medium.

As schematically illustrated in FIGS. 1A and 1B, a slider 5 of a thermally-assisted magnetic head 1 includes a magnetic recording element 21 for configuring a recording head part, and a waveguide 2 into which laser light utilized for heating the magnetic recording medium enters. The waveguide 2 is configured with a core 3 and a cladding 4 surrounding the periphery of the core 3. In the slider 5 of the thermally-assisted magnetic head 1, a plasmon generator 16 couples to propagation light entering into and propagating through the core 3 in a surface plasmon mode, and surface plasmon is generated. The generated surface plasmon propagates toward an ABS, and near-field light is generated at a near-field-generator positioned at an edge part of the plasmon generator 16 on the ABS side. Simultaneously with heating the magnetic recording medium locally with the near-field light converted from the laser light as described above, by generating magnetic flux that travels to the magnetic recording medium in a pole 10 of the magnetic recording element 21, magnetic information is recorded. The plasmon generator 16 is in a V-shape that is protuberant toward the core 3 on the ABS. Regarding the pole 10, at least a portion on the plasmon generator 16 side on the ABS is a reverse-triangle shaped portion along the plasmon generator 16. The plasmon generator 16 being in the V-shape that is protuberant toward the core 3, as described above, leads to closer distance between the heating center on the magnetic recording medium and the magnetic field center from the pole to the magnetic recording medium, enabling recording with high line density. In the thermally-assisted magnetic head 1 of the present invention, the plasmon generator 16 is configured with a first part 16a on the ABS side and a second part 16b positioned away from the ABS.

The technical significance of the present invention that includes, as described above, the plasmon generator 16 configured with the first part 16a and the second part 16b will be explained.

The present inventors determined that a major factor of the power reduction problem with the conventional thermally-assisted magnetic head is the temperature increase of the thermally-assisted magnetic head itself. Also the present inventors determined that one factor of the temperature increase is loss generated when surface plasmon propagates through a propagation edge of the plasmon generator 16. The propagation loss depends on the optical property (specifically, the value $\in''$ which is an imaginary component of permittivity) of materials of the plasmon generator 16. The effect of the value $\in''$ on the propagation loss of the surface plasmon may be understood from the following equation in the attenuating energy P of an electromagnetic wave is expressed by $P=\frac{1}{2}\in''|E|^2$ (herein, E: electric field, $\omega$: oscillation frequency of electric field).

Therefore, when the plasmon generator 16 is configured with a material with a small value $\in''$ (for example, Ag), the propagation loss of the surface plasmon becomes reduced and the temperature increase of the thermally-assisted magnetic head 1 itself is suppressed, which is preferable. Note, the values $\in''$ of Ag, Au and Cu are listed in "Optical Constants of the Noble Metals," P. B. Johnson and R. W. Christy, Physical Review Volume 6, Number 12, p. 4370, Dec. 15, 1972.

However, even when the material (for example, Ag) of the plasmon generator 16 is selected considering optical properties as the primary focus, the problem remains in which the material of the plasmon generator 16 deforms as a result of migration due to heat during the actual performance of the thermally-assisted magnetic recording. The phenomenon is particularly prominent on and near the ABS, and reasons thereof may be assumed as follows. Excitation of the surface plasmon leads to an effective temperature increase in the thermally-assisted magnetic head 1 that generates near-field light utilizing evanescent light. Namely, when the surface plasmon is excited, an edge of the plasmon generator 16 is in a state that is substantially the same as the high temperature state, i.e., a state where electrons actively move. Therefore, it is estimated that the migration may occur in the material of the plasmon generator 16 as a result of the active movement of the electrons when the temperature is far lower than the melting point. Note, in the edge of the plasmon generator 16, a portion closer to the ABS has a higher temperature in relation with radiation heat from the magnetic recording medium and the energy conversion loss at the end part of the plasmon generator 16. Therefore, it may be estimated that the migration in the edge of the plasmon generator 16 intensively occurs on and near the ABS. It is preferred that the plasmon generator 16, or at least the portion on and near the ABS, is configured with a material (high melting point material) in which the migration is less likely to occur.

Based on the above-described discussions, the present inventors determined that the plasmon generator 16 is preferably configured with a first part 16a and a second part 16b. The first part 16a is a portion on and near the ABS and is configured with a material (high melting point material) in which the migration is less likely to occur. The second part 16b is the other portion (portion away from the ABS in the height direction) and is configured with a material with a small value $\in''$ for suppressing the propagation loss of the surface plasmon.

According to the above-described configuration of the present invention, it is possible to reduce the propagation loss of the surface plasmon and thereby suppress the temperature increase. Furthermore, it is possible to structure the plasmon generator such that migration rarely occurs under the same condition. As a result, sequential deformation and sequential power reduction of the plasmon generator 16 of the thermally-assisted magnetic head 1 may be suppressed.

Note, in order to suppress the loss generated when the surface plasmon is received and delivered between the first part 16a and the second part 16b, which are dissimilar metals, it is effective to form a diffusion layer between the metals by configuring the first part 16a and the second part 16b of the plasmon generator 16 utilizing a combination of two or more metals that are in a solid solution state.

Figure 2:
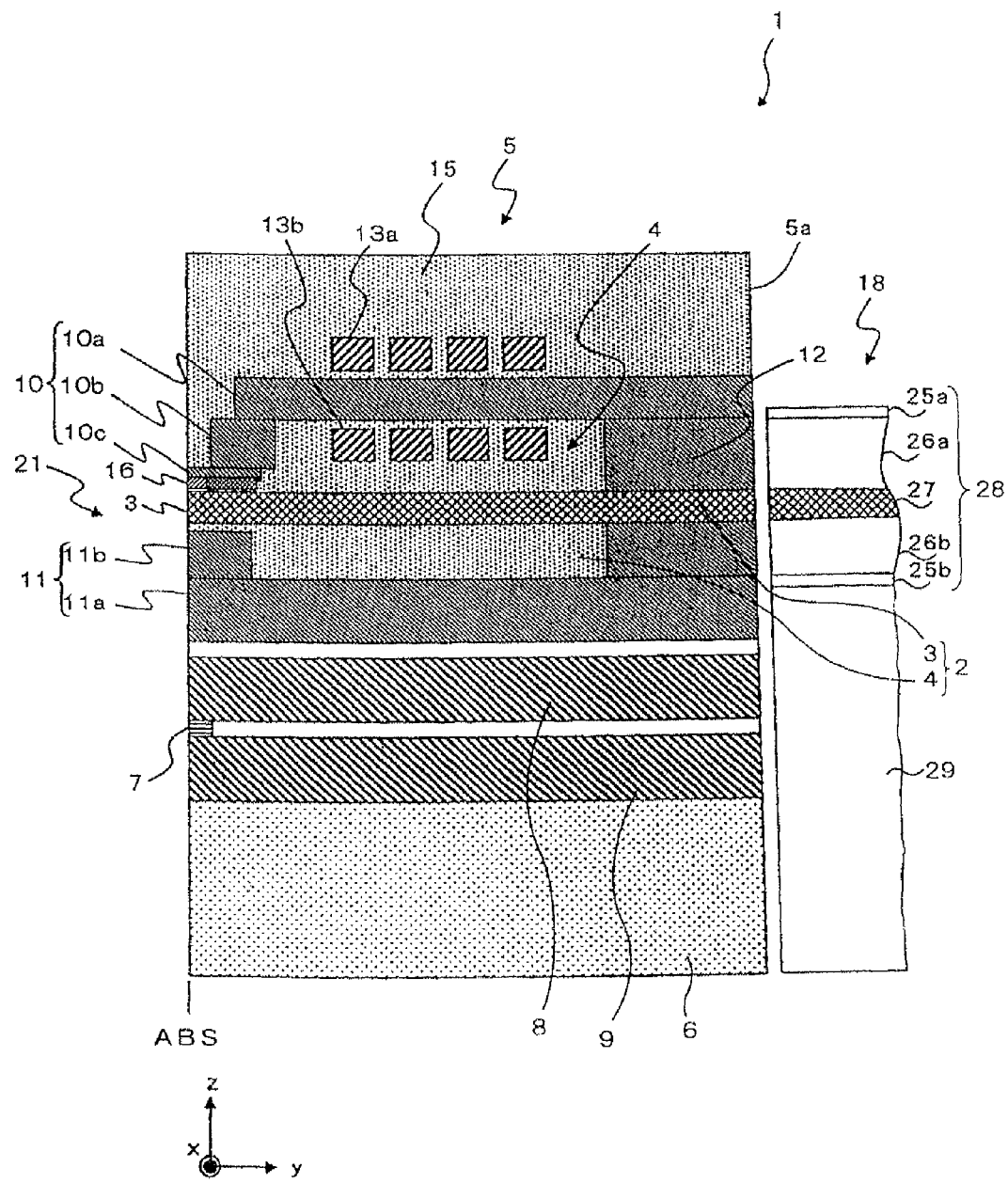
FIG. 2 is a cross sectional view illustrating details of a main part of the thermally-assisted magnetic head illustrated in FIGS. 1A-1B.
Figure 3:
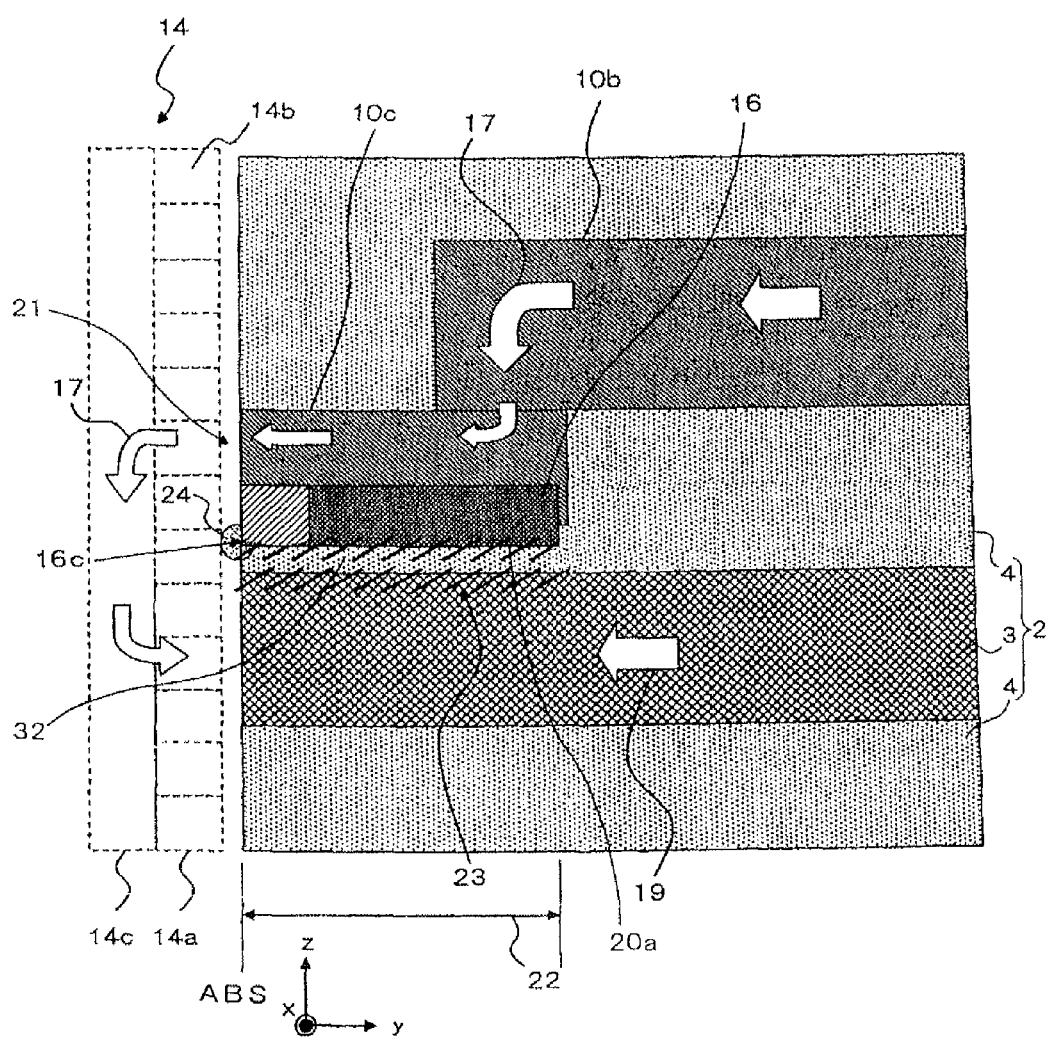
FIG. 3 is an enlarged view of the vicinity of a plasmon generator of the thermally-assisted magnetic head illustrated in FIG. 2.

Further detailed description regarding a specific structure of the above-described thermally-assisted magnetic recording head 1 of the present embodiment will be provided. FIG. 2 is a cross-sectional view illustrating details of a main part of the thermally-assisted magnetic head 1 illustrated in FIGS. 1A and 1B. FIG. 3 is an enlarged view of a part of the slider 5. As illustrated in FIG. 2, the slider 5 has a configuration in which an MR element 7 that configures a reproducing head part and a magnetic recording element 21 that is a recording head part are laminated on a substrate 6 made of ALTIC ($Al_2O_3$. TiC). In the following description, a "lamination direction" indicates a film formation direction and a direction orthogonal to a film surface in a wafer formation process, and corresponds to the z-direction in the drawings. "Upper in the lamination direction" refers to a direction oriented toward an overcoat layer 15 from the substrate 6. "Lower in the lamination direction" refers to a direction oriented toward the substrate 6 from the overcoat layer 15.

The slider 5 includes the MR element 7, as the reproducing head part, having an end exposed on the ABS, and an upper shield layer 8 and a lower shield layer 9 disposed sandwiching the MR element 7 from the upper side and the lower side in the lamination direction. The MR element 7 may have any configuration utilizing a magneto resistive effect, such as for example a current in plane (CIP)—giant magneto resistive (GMR) element in which a sense current flows in the direction parallel to the film surface, a current perpendicular to plane (CPP)—giant magneto resistive (GMR) element in which a sense current flows in the direction perpendicular to the film surface (the lamination direction), or a tunneling magneto resistive (TMR) element that utilizes a tunnel effect, or the like. When a CPP-GMR element or a TMR element is used as the MR element 7, the upper shield layer 8 and the lower shield layer 9 are also utilized as electrodes for supplying a sense current.

The slider 5 includes the magnetic recording element 21 for so-called perpendicular magnetic recording as the recording head part. The magnetic recording element 21 includes a pole 10 for recording. The pole 10 has a first body part 10a, a second body part 10b and a pole tip part 10c, all of which are formed of, for example, an alloy made of any two or three of Ni, Fe, and Co. A return shield layer 11 is disposed in the downward lamination direction of the pole 10. The return shield layer 11 includes a first body part 11a and a second body part 11b, both of which are also formed of an alloy made, for example, of any two or three of Ni, Fe and Co. The pole 10 and the return shield layer 11 are magnetically linked with each other via a contact part 12. In the present embodiment, the return shield layer 11 is disposed lower than the pole 10 in the lamination direction; however, it may be also possible to be disposed upper than the pole 10 in the lamination direction. The overcoat layer 15, made of $Al_2O_3$, is disposed upper than the pole 10 in the lamination direction.

Coils 13a and 13b are wound around the pole 10 being centered on the contact part 12. Magnetic flux is generated at the pole 10 by a current applied to the coils 13a and 13b from the outside. The coils 13a and 13b are formed of a conductive material such as, for example, Cu. The coils 13a and 13b in the present embodiment are disposed in a two-layer manner; however, one layer or three or more layers are also practical. Furthermore, the number of windings is four in the present embodiment; however, the number is not limited to four.

The pole 10 is tapered at the pole tip part 10c in the vicinity of the ABS not only in the direction orthogonal to a film surface (the z-direction) but also in a cross track direction (the x-direction). Magnetic flux 17 generated in the pole 10 shown in FIG. 3 is tapered as it travels toward the ABS, and the minute and strong magnetic flux 17 for writing, which is suitable for high recording density, is discharged toward the magnetic recording medium 14 from the pole tip part 10c positioned on the ABS. The magnetic recording medium 14 has a configuration for perpendicular magnetic recording. A surface layer of the magnetic recording medium 14 is a recording layer 14a. The magnetic flux 17 discharged from the pole tip part 10c travels through the recording layer 14a in the perpendicular direction (the y-direction), and magnetizes recording bits 14b of the recording layer 14a in the perpendicular direction. After the magnetic flux 17 passes through the recording layer 14a, the magnetic flux 17 changes its magnetic path into an in-plane direction (the z-direction) of the magnetic recording medium 14 in an under layer 14c underneath made from a soft magnetic body. Furthermore, the magnetic flux 17 changes the direction into the perpendicular direction (the y-direction) again in the vicinity of the return shield layer 11, and the magnetic flux 17 is absorbed by the return shield layer 11. In other words, the return shield layer 11, illustrated in FIG. 2, functions to control the magnetic flux 17 such that the magnetic flux 17 passes perpendicularly through the recording layer 14a and creates the U-shaped magnetic path.

The pole 10 of the present embodiment is reverse-triangular shaped along the plasmon generator 16 on the ABS (see FIG. 1A).

Furthermore, the second body part 11b of the return shield layer 11 forms a trailing shield part whose layer cross section is wider in the cross track direction (the x-direction) than the first body part 11a. The placement of such a return shield layer 11 causes a steeper gradient of the magnetic field between the return shield layer 11 and the pole 10 in the vicinity of the ABS. As a result, signal output jitter is reduced and an error rate at the time of reading may be decreased.

The waveguide 2 and the plasmon generator 16 are disposed between the pole 10 and the return shield layer 11. The waveguide 2 is configured with the core 3 and the cladding 4 surrounding the core 3. The core 3 has a higher refractive index than the cladding 4. Laser light 19 (see FIG. 3), entering from a LD 28 into the core 3, is tapered by a spot size converter that is a tapered shape part of the core 3 while reflecting completely off the interface with the cladding 4, and propagates toward the ABS. The cladding 4 is formed of, for example, $AlO_x$. The core 3 is formed of, for example, $TaO_x$. Herein, $AlO_x$ indicates aluminum oxide of arbitrary composition, and $Al_2O_3$ is typical; however, $AlO_x$ is not limited to this. Similarly, $TaO_x$ indicates tantalum oxide of arbitrary composition, and $Ta_2O_5$, TaO, $TaO_2$, etc. are typical; however, $TaO_x$ is not limited to these. In order to connect to the LD 28, the core 3 extends from the ABS to a back surface 5a of the slider 5. In addition, although not illustrated in the drawings, the cladding 4 exists between the core 3 and the contact part 12 as well.

Figure 4:
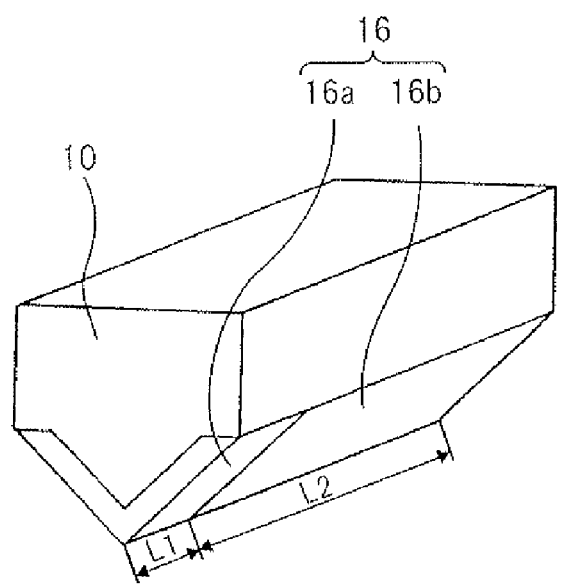
FIG. 4 is a perspective view of the plasmon generator and a pole of the thermally-assisted magnetic head illustrated in FIGS. 1A-1B.

The plasmon generator 16 is positioned away from the substrate 6, and extends to the ABS facing a part of the core 3. As illustrated in FIGS. 1B and 4, the plasmon generator 16 is configured with the first part 16a positioned on and near the ABS and the second part 16b that is the other part (positioned away from the ABS in the height direction). The first part 16a of the plasmon generator 16 is configured with a high melting point material, for example Au and Al, in which migration rarely occurs. The second part 16b is configured with a material, for example Ag, with a small value $\in''$, which is an imaginary component of permittivity. As one example, a length of the first part 16a in the height direction is 100 nm, and a length of the second part 16b in the height direction is 1100 nm. With the configuration, as described above, the migration in the plasmon generator 16 of the thermally-assisted magnetic head 1 is prevented, and the sequential power reduction is suppressed.

The plasmon generator 16 is a V-shaped metallic piece that is protuberant toward the core 3 on the ABS and the cross sections parallel thereto as illustrated in FIG. 1A. An apex, facing the core 3, of the V-shaped plasmon generator 16 configures a propagation edge 20a extending in a longitudinal direction (the y-direction) of the plasmon generator 16. A buffer portion 32 (see FIG. 3) is a portion sandwiched by the core 3 and a bottom surface including the propagation edge 20a of the plasmon generator 16. In other words, the propagation edge 20a is covered by the buffer portion 32. The buffer portion 32 functions to couple the propagation light propagating through the core 3 with the plasmon generator 16 in the surface plasmon mode. A near-field-generator 16c is formed at an edge part on the ABS of the propagation edge 20a.

With the above-described configuration, as illustrated in FIG. 3, the plasmon generator 16 is coupled with propagation light 19 propagating through the core 3 in the surface plasmon mode by the function of the buffer portion 32 at an overlapping part 22 where the propagation edge 20a overlaps the core 3, and generates a surface plasmon 23. The generated surface plasmon 23 propagates toward the ABS along the propagation edge 20a and reaches the near-field-generator 16c. Then, the propagating surface plasmon 23 generates near-field light 24 at the near-field-generator 16c.

The plasmon generator 16 extends nearly parallel to the core 3 and in a direction (y-direction) perpendicular to the ABS. As illustrated in FIGS. 2 and 3, the plasmon generator 16 does not extend to the back surface 5a of the slider 5.

As illustrated in FIG. 2, the LD 28, which is a light source, is linked with the back surface (light incident surface) 5a of the slider 5. The LD 28 has a pair of electrodes 25a and 25b, a positive (P) type cladding 26a and a negative (N) type cladding 26b that are sandwiched by the electrodes 25a and 25b, and an active layer 27 positioned between both of the claddings 26a and 26b, and these cleavage surfaces are in a reflecting mirror structure. The LD 28 is mounted on an LD sub-mount 29, and is aligned properly with respect to the slider 5. As a result, the active layer 27 that continuously oscillates the laser light 19 is aligned with the core 3 of the slider 5 such that the laser light 19 generated in the active layer 27 enters into the core 3. The wavelength of the laser light 19 is not particularly limited; however, laser light having a wavelength of approximately 800 nm is preferably utilized.

The core 3 of the waveguide 2 may extend as a square pillar with an uniform cross section; however, on the other hand, the core 3 of the waveguide 2 may be configured with the spot size convertor and a straight portion. The spot size convertor is gradually tapered from the back surface 5a side of the slider 5, i.e., from a side of the LD 28. The straight part is positioned on the ABS side. As one example, a diameter of the propagation light 19 propagating through the core 3 is tapered when the propagation light 19 passes through the spot size converter having a length of approximately 100 μm or less, and the propagation light 19 enters into the straight portion having a rectangular cross section of a width 0.4 μm×a height 0.5 μm.

When magnetic recording is performed to the magnetic recording medium 14 utilizing the thermally-assisted magnetic head 1 having the above-described configuration, power is supplied to the pair of the electrodes 25a and 25b of the LD 28, which are linked with the back surface 5a of the slider 5, the active layer 27 then generates the laser light 19 and the laser light 19 enters into the core 3 facing the active layer 27. The incident laser light 19 propagates toward the ABS in the core 3 as the diameter is tapered in the spot size converter. At the overlapping part 22 overlapping with the core 3, the plasmon generator 16 couples to the propagation light 19 propagating through the core 3 in the surface plasmon mode due to the function of the buffer portion 32, and generates the surface plasmon 23. The surface plasmon 23 propagates along the propagation edge 20a of the plasmon generator 16 and reaches the near-field-generator 16c. The near-field light 24 is generated based on the surface plasmon 23 at the near-field-generator 16c. A portion (a portion to which information is recorded) of the recording layer 14a of the magnetic recording medium 14 is heated by this near-field light 24, and the coercive force is decreased. Then, simultaneously with this heating, current is applied to the coils 13a and 13b. Thereby, magnetic flux is generated in the pole 10 and the information is written. Since the near-field-generator 16c that performs the heating and the pole 10 that performs the writing are closely positioned, the information is efficiently written to the portion of the recording layer 14a of the magnetic recording medium 14 where the coercive force is decreased due to the heating.

Next, one example of a manufacturing method of the thermally-assisted magnetic head 1 of the present embodiment will be explained. Note, a detailed explanation of processes to which a known method may be arbitrarily applied is omitted.

Initially, as illustrated in FIG. 2, the lower shield layer 9, the MR element 7 that is a reproducing element, the upper shield layer 8 and the return shield layer 11 are laminated in this order above the substrate 6 that is made of $Al_2O_3.TiC$. Additionally, in the middle of this process, an insulation layer is appropriately disposed respectively between the lower shield layer 9 and the upper shield layer 8 and between the upper shield layer 8 and the return shield layer 11.

Next, the cladding 4 made of $AlO_x$ and the core 3 made of $TaO_x$ are laminated in this order, and patterning is performed. Propagation of single mode light is necessary to induce the near-field light; and a cross sectional size of the core 3 should be a wavelength of the propagation light 19 or less, although it is dependent on refractive indices of the core 3 and the cladding 4. In the present example, a patterning is performed on the core 3 such that an edge surface exposed on the ABS becomes a rectangle of width 0.4 μm×height 0.5 μm, and the laser light 19 having the wavelength of 0.8 μm is propagated. In the figures, the cladding 4 that is formed beforehand and the cladding 4 that is newly laminated are illustrated in an integrated manner.

The cladding 4 that is a dielectric body spacer layer is formed above the core 3, and a V-shaped groove is formed on an upper surface of the cladding 4. The plasmon generator 16 is formed in the V-shaped groove. Specifically, as illustrated in FIG. 5A, a resist 30a for forming the second part 16b is formed in the V-shaped groove of the cladding 4. As illustrated in FIG. 5B, a material of the second part 16b is then formed in a lamination manner. As illustrated in FIG. 5C, the resist 30a and the material laminated thereon are then removed. Therefore, the second part 16b is formed in a portion where the resist 30a is not formed. Next, as illustrated in FIG. 5D, a resist 30b for forming the first part 16a is formed on the second part 16b. As illustrated in FIG. 5E, a material of the first part 16a is then formed in a lamination manner. As illustrated in FIG. 5F, the resist 30b and the material laminated thereon are then removed. As described above, the first part 16a is formed in a portion where the resist 30a is not formed, and the plasmon generator 16 having a configuration in which the first part 16a and the second part 16b are joined is completed. The plasmon generator 16 formed as described above has a V-shaped cross sectional shape along the shape of the groove.

The pole 10 is formed on the plasmon generator 16. A lower portion of the pole 10 is formed in a reverse-triangle shape along the shape of the plasmon generator 16. In other words, the pole 10 configured with the reversed-triangle-shaped lower portion and a quadrangle-shaped upper portion is formed on the V-shaped plasmon generator 16. The cladding 4 is formed surrounding the plasmon generator 16 and the pole 10. Then, the coil layers 13a and 13b and the overcoat layer 15, which are illustrated in FIG. 2, are formed.

Ion milling is performed on the slider 5, which is formed as described, to form the ABS facing the magnetic recording medium 14.

Thereafter, the LD unit 18 including the LD 28 that generates laser light having a wavelength of 800 nm is attached to the slider 5 while alignment is performed to link the LD 28 with the core 3 of the waveguide 2.

Figure 6:
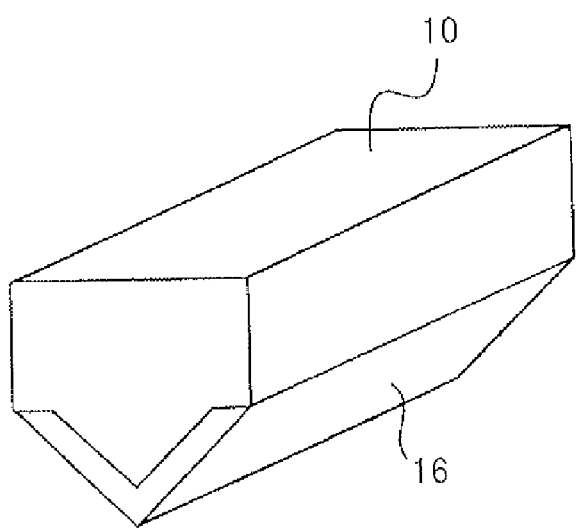
FIG. 6 is a perspective view of a plasmon generator and a pole of a thermally-assisted magnetic head of a reference example.

Materials for a plasmon generator 16 of a thermally-assisted magnetic head 1, which is manufactured as described above, of an example of the present invention have been discussed. A first reference example in which a plasmon generator 16 illustrated in FIG. 4 includes a first part 16a made of Al and a second part 16b made of Au, and a first embodiment in which a first part 16a is made of Au and a second part 16b is made of Ag were discussed. Similarly, a second reference example in which a plasmon generator 16 is made of only Au as illustrated in FIG. 6, and a third reference example in which a plasmon generator 16 is made of only Ag were discussed.

Specifically, regarding the first embodiment and the first through third reference examples, the maximum optical power density above a magnetic recording medium when near field light 24 is generated at the near-field-generator 16c by light entering with the predefined intensity into the core 3 were calculated by simulation utilizing a finite-difference time-domain (FDTD) method. Table 1 illustrates the results. In Table 1, the results are illustrated based on a specified value: maximum optical power density of the second reference example where the plasmon generator 16 is made of only Au is 1.00. Note, when the maximum optical power density is large, the magnetic recording medium can be efficiently heated; however, on the other hand, when the maximum optical power density is small, the heating efficiency is poor.

TABLE 1

| | Plasmon Generator | | Maximum Optical Power Density | Power Reduction |
|---|---|---|---|---|
| | First Part | Second Part | | |
| First Embodiment | Au | Ag | 1.47 | 1.0 |
| First Reference Example | Al | Au | 0.24 | 8.0 |
| Second Reference Example | | Au | 1.00 | 1.0 |
| Third Reference Example | | Ag | 1.50 | 10.2 |

Also, writing tests were performed regarding the above-described thermally-assisted magnetic heads. Specifically, simultaneously with performing thermally-assisted magnetic recording to the magnetic recording medium 14 utilizing the magnetic recording element 21, the recorded magnetic information was reproduced by the MR element 7, which is adjacent to the magnetic recording element 21, and the reproducing power was measured. The amount of reduction of the reproducing power was determined after recording and reproducing were continuously performed for an hour. Note, the tests were performed under a condition where linear recording density was 500 kFCI and rotation speed of the magnetic recording medium was 3600 rpm. In Table 1, the results are illustrated based on a specified value: power reduction of the second reference example was 1.0.

Table 2 illustrates melting points and values $\epsilon''$ of various materials including the materials of the plasmon generators 16 of the first embodiment and the first through third reference examples. The value $\epsilon''$ is an imaginary component of permittivity when the wavelength is 797 nm.

TABLE 2

| Material | Melting Point (° C.) | Value $\epsilon''$ (Wavelength 797 nm) |
|---|---|---|
| Ag | 933 | 0.40 |
| Al | 1234 | 28.28 |
| Au | 1336 | 1.48 |
| Cu | 1356 | 2.51 |
| Ni—18at % Fe | 1446 | 32.12 |
| Co—18at % Fe | 1485 | 21.83 |
| Co—70at % Fe | 1492 | 24.10 |

Initially focusing on the third reference example, it is understood that the maximum optical power density is large and the power reduction is large compared to the second reference example from Tables 1 and 2. In other words, the maximum optical power density is large because the value $\epsilon''$ of Ag that configures the plasmon generator 16 of the third reference example is small; however, on the other hand, sequential power reduction is large because the melting point of Ag is low so that migration is more likely to occur.

Next, focusing on the first reference example, the maximum optical power density is low and the power reduction is large compared to the second reference example. This is because, in the first reference example and on and near the ABS, the melting point of the first part 16a made of Al is low so that migration due to heat is more likely to occur, and the value $\epsilon''$ of Au that configures the second part 16b is slightly large and the value $\epsilon''$ of Al that configures the first part 16a is significantly large so that the propagation loss of the surface plasmon is large. In the first reference example, it is assumed that, in particular, the propagation loss of the surface plasmon at the first part 16a is significantly large.

On the other hand, in the first embodiment, optimal results in that the maximum optical power density is high and the power reduction is small were obtained. This is because, in and near the ABS, the melting point of the first part 16a made of Au is high so that migration due to heat is less likely to occur, and the value $\epsilon''$ of Ag that configures the second part 16b is small so that the propagation loss of the surface plasmon is small.

Note, the second reference example has a structure in which Ag is exposed on the ABS, which is not preferable in view of process resistance because accuracy and reliability are deficient.

As described above, it is recognized that a high melting point of the first part 16a is particularly important in order to suppress the power reduction of the thermally-assisted magnetic head, and that a low value $\epsilon''$ of the second part 16b is particularly important in order to increase the maximum optical power density and enhance the heating efficiency. Accordingly, it is determined that combinations illustrated in the following Table 3 out of the materials illustrated in Table 2 are preferable. Note, Ni-18 at % Fe, Co-18 at % Fe and Co-70 at % Fe are collectively referred to as magnetic materials.

TABLE 3

| First Part | Second Part |
|---|---|
| Au | Ag |
| Cu | Ag |
| Cu | Au |
| Magnetic Material | Ag |
| Magnetic Material | Au |
| Magnetic Material | Cu |

On the other hand, combinations illustrated in the following Table 4, which are opposite combinations from the combinations of Table 3, are not effective.

TABLE 4

| First Part | Second Part |
|---|---|
| Ag | Au |
| Ag | Cu |
| Au | Cu |
| Ag | Magnetic Material |
| Au | Magnetic Material |
| Cu | Magnetic Material |

Furthermore, a configuration in which the first part 16a is made of Au and the second part 16b is made of Ag, which is a combination that are both in a solid solution state is preferable because a diffusion layer is formed at an interface so that a loss that is generated when the surface plasmon is received and delivered between the first part 16a and the second part 16b may be suppressed.

Note, a material that configures the first part 16a has a higher melting point than, at least, that of a material that configures the second part 16b, and preferably has a melting point of 1200° C. or more. On the other hand, a material that configures the second part 16b has a smaller value ∈" than, at least, that of a material that configures the first part 16a, and preferably has a value ∈" of 3 or less.

The length of the first part 16a and the second part 16b of the plasmon generator 16 of the present invention in the height direction (a direction orthogonal to the ABS) was discussed. Specifically, a plurality of thermally-assisted magnetic heads 1 was manufactured, and the maximum optical power density and the power reduction were obtained. The thermally-assisted magnetic heads 1 had the configuration in which the first part 16a was made of Au and the second part 16b was made of Ag, which is the above-described preferable combination, and each of the thermally-assisted magnetic heads 1 had different lengths L1 of the first part 16a in the height direction and different lengths L2 of the second part 16b in the height direction (see FIG. 4). Table 5 and FIG. 7 illustrate the results. The total length of the plasmon generator 16 is 1500 nm in all of the examples. Note, in Table 5 and FIG. 7, the results are illustrated based on a specified value: maximum optical power density and the power reduction of the example 8 are both 1.

TABLE 5

|  | Length L1 (nm) | Length L2 (nm) | Maximum Optical Power Density | Power Reduction |
|---|---|---|---|---|
| Example 1 | 0 | 1500 | 1.50 | 10.2 |
| Example 2 | 10 | 1490 | 1.43 | 6.0 |
| Example 3 | 30 | 1470 | 1.48 | 1.2 |
| Example 4 | 50 | 1450 | 1.44 | 1.1 |
| Example 5 | 100 | 1400 | 1.47 | 1.0 |
| Example 6 | 500 | 1000 | 1.41 | 1.0 |
| Example 7 | 1000 | 500 | 1.22 | 1.0 |
| Example 8 | 1500 | 0 | 1.00 | 1.0 |

Referring to Table 5, it is determined that the first part 16a with a length L1 of 30 nm-1000 nm is extremely preferable because the maximum optical power density is large and the power reduction is small.

Figure 8A:
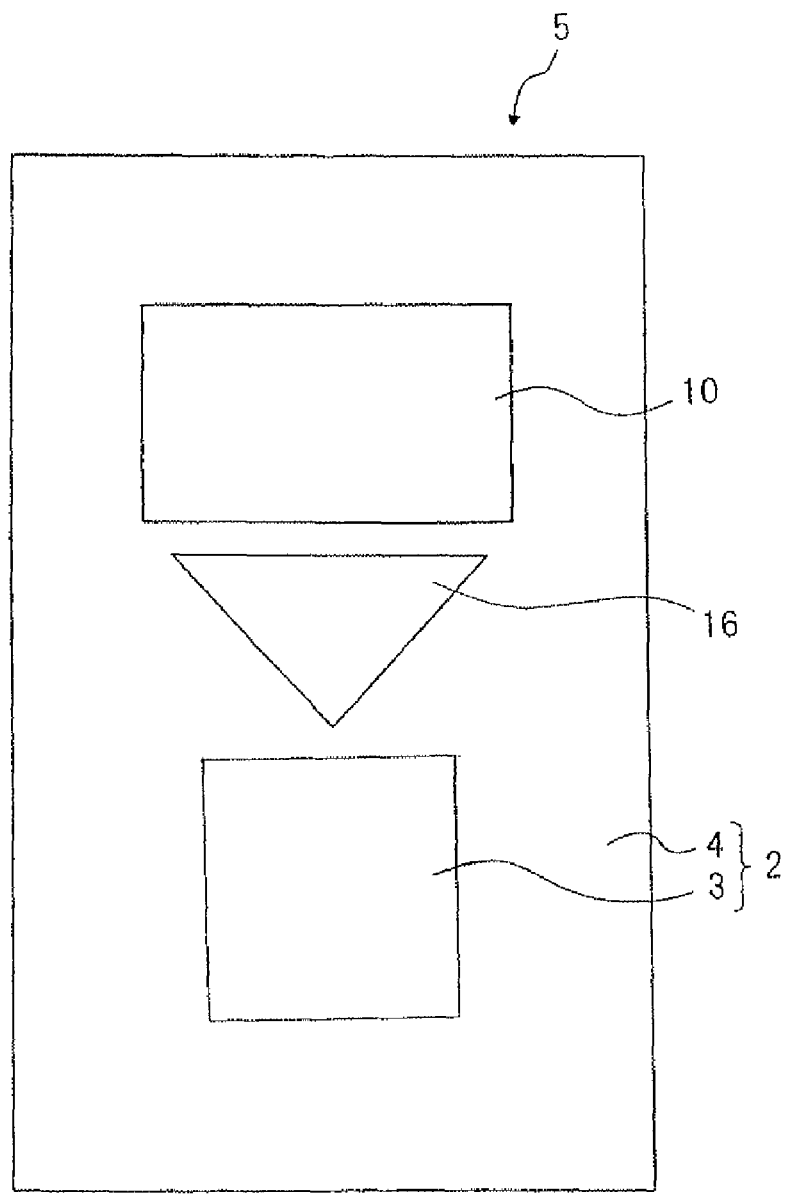
FIG. 8A is a schematic view of an ABS of a thermally-assisted magnetic head of another embodiment of the present invention.
Figure 8B:
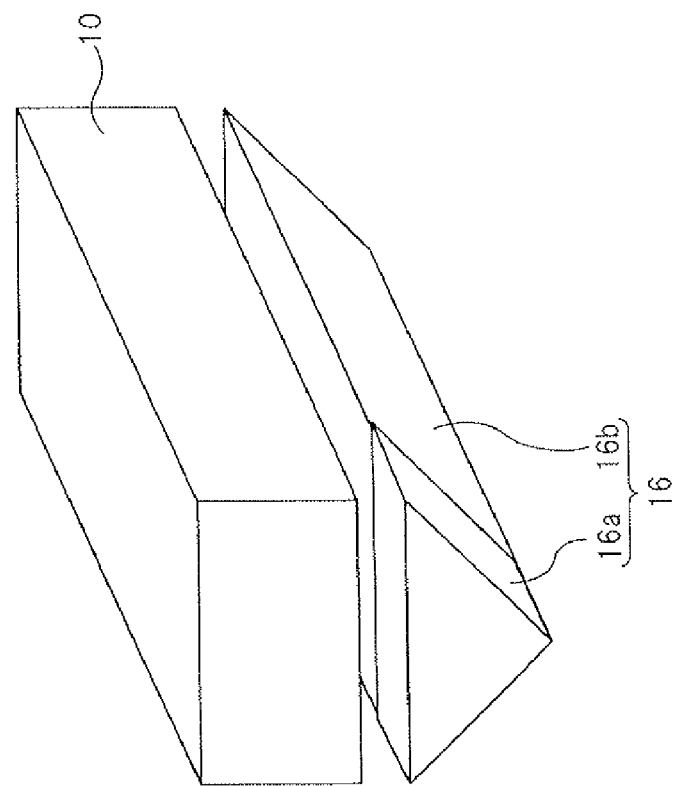
FIG. 8B is a perspective view of a plasmon generator and a pole of the thermally-assisted magnetic head illustrated in FIG. 8A.

The present invention is not limited to the configuration including a V-shaped plasmon generator 16 as illustrated in FIGS. 1A and 4, and the present invention is applicable also to configurations including a reverse-triangular plasmon generator 16 as illustrated in FIGS. 8A and 8B.

Furthermore, the present invention is not limited to the thermally-assisted magnetic head 1 utilizing evanescent light; and, the present invention is widely applicable to any thermally-assisted magnetic head including the plasmon generator 16 that is exposed on the ABS and generates near field light. Then, the present invention is particularly effective when the plasmon generator 16 has a protuberant shape toward the core 3 on the ABS.

Figure 9:
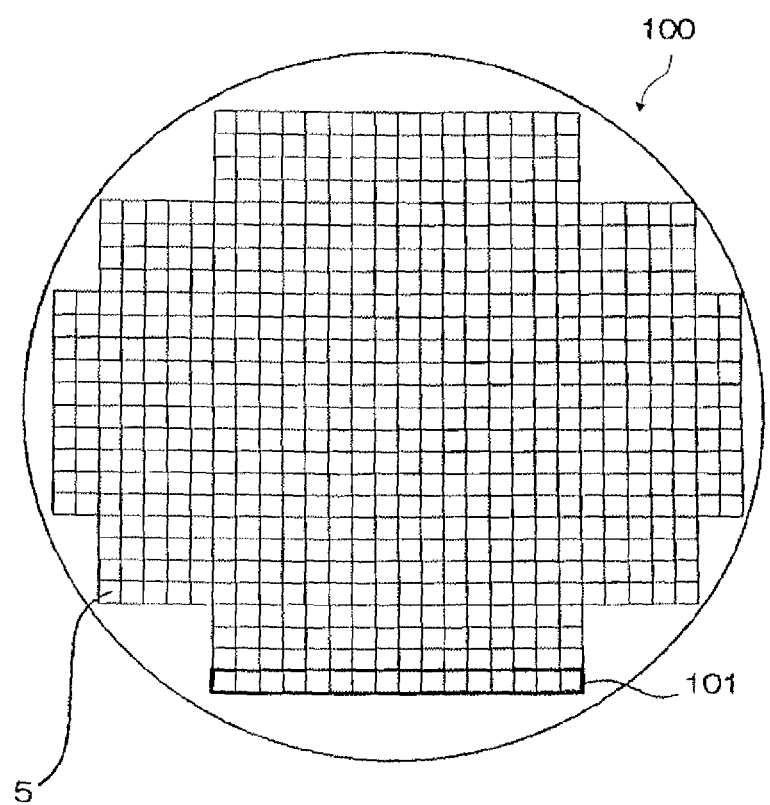
FIG. 9 is a plan view of a wafer where a large number of stacks for configuring a slider of the thermally-assisted magnetic head of the present invention is formed.
Figure 10:
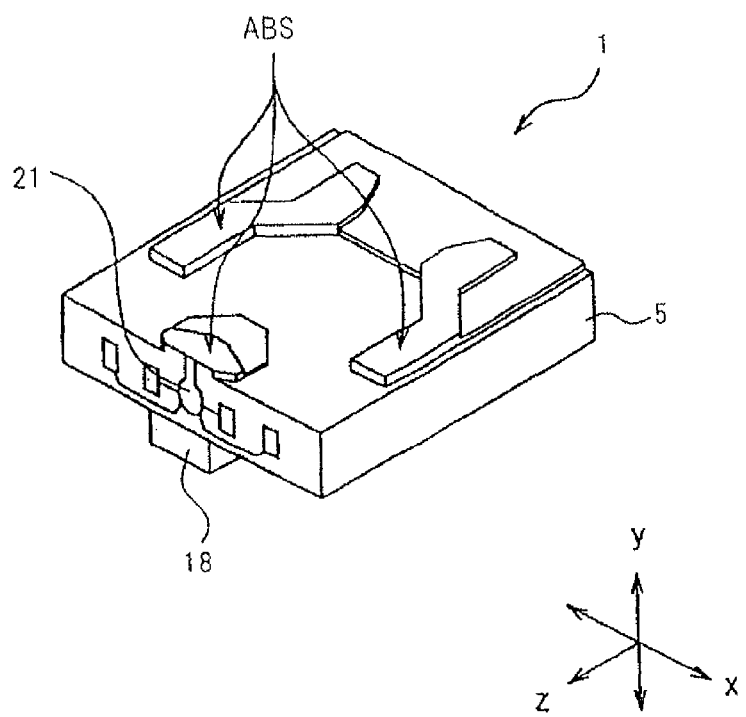
FIG. 10 is a perspective view of the thermally-assisted magnetic head of the present invention, as seen from an ABS side.

For mass-manufacturing the thermally-assisted magnetic heads 1, a large number of stacks configuring the above-described slider 5 are formed on a wafer 100 illustrated in FIG. 9. The wafer 100 is divided into a plurality of bars 101, which are working units for the polishing process of the ABS. The bars 101 are further cut after the polishing process and are divided into the plurality of sliders 5. Cutting margins (not illustrated), which are for cutting the wafer 100 into the bars 101 and for cutting the bars 101 into the slider 5, are formed in the wafer 100. As illustrated in FIG. 10, each of the sliders 5 has a nearly hexahedral shape, and one surface of the six outer surfaces is the ABS facing a hard disk 14, which is a recording medium. Then, the LD unit 18 aligned with respect to the slider 5 is attached to the slider 5, and the thermally-assisted magnetic head 1 is configured.

Figure 11:
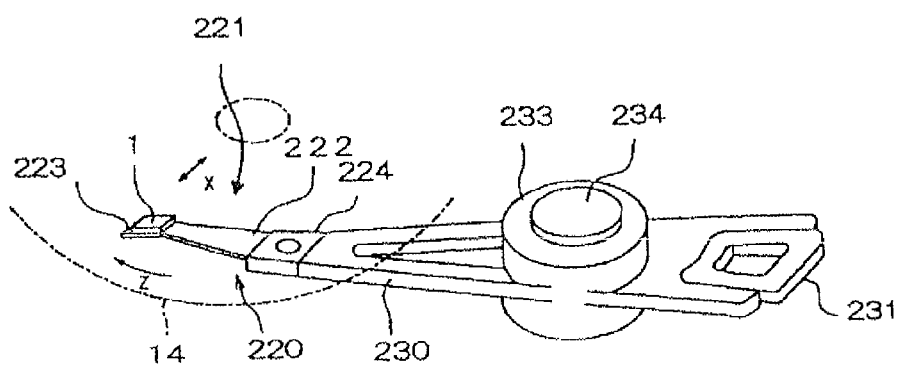
FIG. 11 is a perspective view of a head arm assembly including a head gimbal assembly in which the thermally-assisted magnetic head of the present invention is incorporated.

Referring to FIG. 11, a head gimbal assembly 220 includes the thermally-assisted magnetic head 1 and a suspension 221 elastically supporting the thermally-assisted magnetic head 1. The suspension 221 includes a load beam 222, a flexure 223 and a base plate 224. The load beam 222 is formed in a plate spring shape and made of stainless steel. The flexure 223 is attached at one edge part of the load beam 222. The base plate 224 is attached at the other edge part of the load beam 222. The flexure 223 is joined to the thermally-assisted magnetic head 1 to give the thermally-assisted magnetic head 1 suitable flexibility. At the part of the flexure 223 to which the thermally-assisted magnetic head 1 is attached, a gimbal part is disposed to maintain the thermally-assisted magnetic head 1 in an appropriate orientation.

The thermally-assisted magnetic head 1 is arranged in the hard disk device so as to face the hard disk 14, which is a disk-shaped recording medium that is rotatably driven. When the hard disk 14 rotates in the z-direction of FIG. 11, air flow passing between the hard disk 14 and the thermally-assisted magnetic head 1 generates a downward lifting force in the y-direction to the thermally-assisted magnetic head 1. The thermally-assisted magnetic head 1 flies from the surface of the hard disk 14 due to the lifting force. At the edge part of the slider 5 of the thermally-assisted magnetic head 1 on the air flow exit side (a left side of FIG. 10), the magnetic recording element 21 is formed.

An assembly in which the head gimbal assembly 220 is mounted on an arm 230 is referred to as a head arm assembly 221. The arm 230 moves the thermally-assisted magnetic head 1 in the track crossing direction x of the hard disk 14. One edge of the arm 230 is mounted on the base plate 224. On the other edge of the arm 230, a coil 231 is mounted, which forms one part of a voice coil motor. A bearing part 233 is attached in the middle section of the arm 230. The arm 230 is rotatably supported by a shaft 234 mounted on the bearing part 233. The arm 230 and the voice coil motor for driving the arm 230 configure an actuator.

Figure 12:
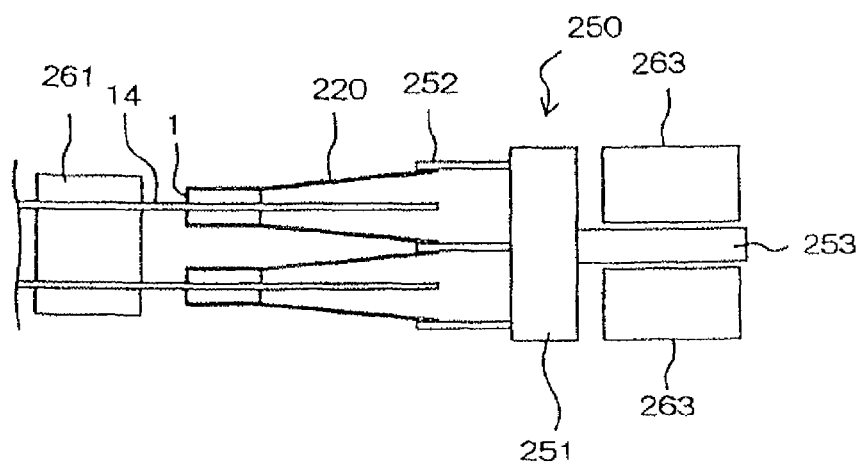
FIG. 12 is a side view of the head arm assembly in which the thermally-assisted magnetic head of the present invention is incorporated.
Figure 13:
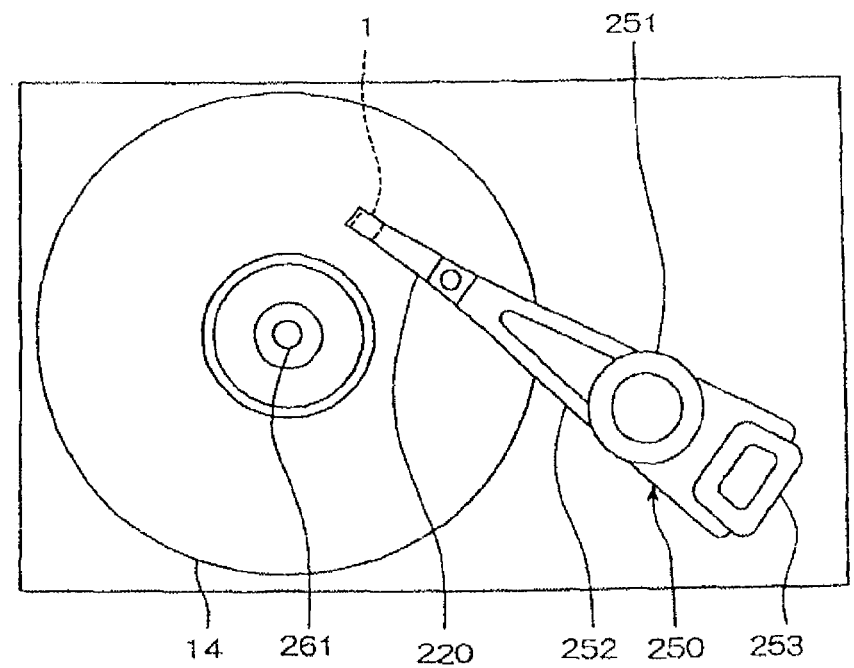
FIG. 13 is a plan view of a hard disk device in which the thermally-assisted magnetic head of the present invention is incorporated.

Next, referring to FIGS. 12 and 13, descriptions regarding a head stack assembly in which the above-described thermally-assisted magnetic head 1 is integrated and the hard disk device will be given. A head stack assembly is an assembly in which the head gimbal assemblies 220 are mounted on each arm of a carriage having a plurality of the arms. FIG. 12 is a side view of the head stack assembly. FIG. 13 is a plan view of the hard disk device. The head stack assembly 250 includes a carriage 251 having a plurality of arms 252. On each of the arms 252, the head gimbal assembly 220 is mounted so that the head gimbal assembly 220 aligns with an interval to another in the vertical direction. At a side, which is opposite to the arm 252, of the carriage 251, a coil 253 is mounted to be a part of the voice coil motor. The voice coil motor has permanent magnets 263 positioned sandwiching the coil 253 and facing each other.

Referring to FIG. 13, the head stack assembly 250 is integrated in the hard disk device. The hard disk device has multiple hard disks 14 mounted on a spindle motor 261. On each of the hard disks 14, two sliders 5 are arranged in a manner of sandwiching the hard disk 14 and facing each other. The head stack assembly 250 except for the thermally-assisted magnetic head 1 and the actuator corresponds to a positioning device of the present invention, and positions the thermally-assisted magnetic head 1 with respect to the hard disk 14 as well as supports the thermally-assisted magnetic head 1. The thermally-assisted magnetic head 1 is moved in the track crossing direction of the hard disk 14 by the actuator, and is positioned with respect to the hard disk 14. The magnetic recording element 21 included in the thermally-assisted magnetic head 1 records the information to the hard disk 14, and the MR element 7 reproduces the information recorded on the hard disk 14.

While preferred embodiments of the present invention have been shown and described in detail, such description is for illustrative purposes only. It is to be understood that changes and variations may be made without departing from the spirit or scope of the following claims.

What is claimed is:

1. A thermally-assisted magnetic head that includes an air bearing surface facing a recording medium and that performs magnetic recording while heating the recording medium, comprising:
   a magnetic recording element including a pole of which one edge part is positioned on the air bearing surface and that generates magnetic flux traveling toward the magnetic recording medium;
   a waveguide configured with a core through which light propagates and a cladding, at least one part of which extends to the air bearing surface, surrounding the periphery of the core; and
   a plasmon generator that faces a part of the core and that extends to the air bearing surface, wherein the plasmon generator is configured with a first part and a second part that are joined; the first part that is positioned on the air bearing surface side and that is made of a high melting point material, and the second part that is positioned away from the air bearing surface and that is made of a material with a small value $\in''$, which is an imaginary component of permittivity.

2. The thermally-assisted magnetic head according to claim 1, wherein
   the plasmon generator has a protuberant shape toward the core on the air bearing surface.

3. The thermally-assisted magnetic head according to claim 1, wherein
   the plasmon generator is in a V-shape protuberant toward the core on the air bearing surface, and
   at least a part of the pole contacting the plasmon generator is in a reverse-triangle shape along the plasmon generator on the air bearing surface.

4. The thermally-assisted magnetic head according to claim 1, wherein
   a length of the first part of the plasmon generator in a height direction orthogonal to the air bearing surface is not less than 30 nm and is not more than 1000 nm.

5. The thermally-assisted magnetic head according to claim 1, wherein
   the high melting point material that configures the first part has a higher melting point than the material with a small value $\in''$ that configures the second part, and the material with small value $\in''$ that configures the second part has a smaller value $\in''$ than the high melting point material that configures the first part.

6. The thermally-assisted magnetic head according to claim 1, wherein
   a melting point of the high melting point material that configures the first part is 1200° C. or more, and a value $\in''$ of the material with a small value $\in''$ that configures the second part is 3 or less.

7. The thermally-assisted magnetic head according to claim 1, wherein
   the high melting point material that configures the first part and the material with a small value $\in''$ that configures the second part are a combination of metals that are both in a solid solution state.

8. The thermally-assisted magnetic head according to claim 7, wherein
   the high melting point material that configures the first part is Au, and the material with a small value $\in''$ that configures the second part is Ag.

9. The thermally-assisted magnetic head according to claim 1, wherein
   the plasmon generator includes one propagation edge extending in a longitudinal direction;
   the propagation edge includes an overlapping part that overlaps the core in the longitudinal direction and a near-field-generator that faces the core and that is positioned in the vicinity of the one edge part of the pole on the air bearing surface;
   the overlapping part of the propagation edge couples to laser light propagating through the core in a surface plasmon mode to generate surface plasmon; and
   the propagation edge propagates the surface plasmon generated at the overlapping part to the near-field-generator.

* * * * *